（12）United States Patent
Matsuura et al.

(10) Patent No.: US 9,465,257 B2
(45) Date of Patent: Oct. 11, 2016

(54) LIQUID CRYSTAL DISPLAY ELEMENT AND METHOD FOR MANUFACTURING THE SAME

(71) Applicant: Japan Display Inc., Minato-ku (JP)

(72) Inventors: Yuki Matsuura, Minato-ku (JP); Muneharu Akiyoshi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/326,804

(22) Filed: Jul. 9, 2014

(65) Prior Publication Data

US 2015/0036093 A1    Feb. 5, 2015

(30) Foreign Application Priority Data

Jul. 30, 2013    (JP) .................... 2013-157918

(51) Int. Cl.
*G02F 1/1339*   (2006.01)
*G02F 1/1333*   (2006.01)
*G02F 1/1341*   (2006.01)

(52) U.S. Cl.
CPC ......... *G02F 1/1339* (2013.01); *G02F 1/13394* (2013.01); *G02F 2001/13415* (2013.01); *G02F 2001/133388* (2013.01)

(58) Field of Classification Search
CPC ............. G02F 1/1339; G02F 1/13394; G02F 1/13392; G02F 2001/13398; G02F 2001/13396; G02F 2001/133388; G02F 2001/13415
USPC .................... 349/153, 155; 445/25
See application file for complete search history.

(56) References Cited

U.S. PATENT DOCUMENTS 8,368,864 B2 * 2/2013 Nagami ............... G02F 1/1339
                                              349/153
2003/0025868 A1 * 2/2003 Hiroshima et al. ........... 349/156
(Continued)

FOREIGN PATENT DOCUMENTS

| CN | 103123425 A | 5/2013 |
| JP | 2003-167258 A | 6/2003 |
| JP | 2003-279998 A | 10/2003 |

(Continued)

OTHER PUBLICATIONS

U.S. Appl. No. 14/326,602, filed Jul. 9, 2014, Akiyoshi.
(Continued)

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

According to one embodiment, a liquid crystal panel includes substrates opposed to each other and paired. The liquid crystal panel includes a liquid crystal layer interposed between the substrates. The liquid crystal panel includes a sealed portion that includes bending corner portions at positions spaced from the outer edges of the substrates, and surrounds the periphery of the liquid crystal layer and bonds the substrates together. The liquid crystal panel includes main spacers that are interposed between the substrates at the position of the liquid crystal layer and hold the gap between the substrates. The liquid crystal panel includes auxiliary spacers that are interposed between the substrates to fill the portions between the outer side portions of the corner portions of the sealed portion and the outer edge sides of the substrates and hold the gap between the substrates.

12 Claims, 5 Drawing Sheets

(a)

(b)

(56) References Cited

U.S. PATENT DOCUMENTS

2010/0149477 A1    6/2010  Nagami
2012/0133874 A1*   5/2012  Hoshina et al. .............. 349/138

FOREIGN PATENT DOCUMENTS

| | | |
|---|---|---|
| JP | 2004-118200 A | 4/2004 |
| JP | 2006-30440 | 2/2006 |
| JP | 2009-80280 A | 4/2009 |
| JP | 2012-118268 A | 6/2012 |
| KR | 10-2001-0024964 A | 3/2001 |
| KR | 10-2003-0013263 A | 2/2003 |
| KR | 10-2004-0034447 A | 4/2004 |
| TW | 200403489 A | 3/2004 |

OTHER PUBLICATIONS

Office Action issued May 20, 2015 in Korean Patent Application No. 10-2014-0097120 (with English language translation).

Office Action issued Sep. 25, 2015 in Korean Patent Application No. 10-2014-0097120 (with English language translation).

Office Action issued Jul. 16, 2015 in Taiwanese Patent Application No. 103116880 (with English translation).

* cited by examiner

LIQUID CRYSTAL DISPLAY ELEMENT AND METHOD FOR MANUFACTURING THE SAME

INCORPORATION BY REFERENCE

The present invention claims priority under 35 U.S.C. §119 to Japanese Patent Application No. 2013-157918 filed on Jul. 30, 2013. The content of the application is incorporated herein by reference in their entirety.

FIELD

Embodiments described herein relate generally to a liquid crystal display element including a sealed portion that has bending corner portions and surrounds the periphery of a liquid crystal layer and bonds substrates together and method for manufacturing the same.

BACKGROUND

Conventionally, in a liquid crystal panel (LCD) being a liquid crystal display element that is generally used, a pair of substrates that are made of, for example, glass and each have electrodes, are bonded together by a sealed portion being an adhesive while a liquid crystal layer is interposed between them, and by applying an electric field to the liquid crystal layer, light transmission/blocking are controlled by the liquid crystal layer to display an image.

When manufacturing such a liquid crystal panel, a so-called one-drop-fill (ODF) method is used.

In such a liquid crystal panel, to accurately control driving of the liquid crystal material of the liquid crystal layer, it is important to control the distance between the substrates (cell gap), and if this distance varies, it leads to display unevenness. As a method for controlling this distance, there is a method in which spherical gap holding members, that is, spacers are sprayed before the substrates are bonded together, however, generally, a columnar pattern, that is, spacers are formed on the pixels of either one of the substrates by using an organic material, etc., with translucency. Specifically, the spacers are positioned at the inner side of the sealed portion and control the gap between the substrates.

In recent years, in a liquid crystal panel to be used for, for example, particularly, a mobile terminal such as a cell phone and a smart phone, to secure a large display region while keeping the small external form, the light shielding portion called a frame region from the display region to the panel end portion is made very narrow, that is, the frame can be increasingly narrowed. The sealed portion for bonding substrates together is disposed in the frame region, so that as the frame is made narrower, the width of the sealed portion becomes narrower, and the bonding area between the substrates decreases and the adhesion becomes weaker. When applying the sealing member, a dispenser being an application device is used, and particularly, at the corner portions, a technique for accurately bending the corner portions at a right angle is not established, so that the corner portions become arcs with a certain level of curvature. On the other hand, to adapt to a narrower frame structure and produce more liquid crystal panels from one large-sized substrate, a layout in which the gap between panels adjacent to each other is small or no gap between panels is adopted. Therefore, to cut-out panels with high accuracy, an outer edge spacer is disposed at the position of the cutting line, and the large-sized substrate is cut together with the outer edge spacer at the position of the outer edge spacer. Therefore, at the positions of the corner portions of each liquid crystal panel, in terms of the manufacturing process for bonding the large-sized substrates together, until the large-sized substrates are cut and divided into panels, voids are formed between the corner portions of the sealing member and the outer edge spacer on the outer sides of the corner portions. The large-sized substrates are bonded together in a vacuum, so that when bonding the substrates together, a liquid crystal material is filled on the inner side of the sealing member, however, the outer side of the sealing member becomes a void. Therefore, when the large-sized substrates are released in the atmosphere after being bonded together, the outer side of the sealing member suddenly changes from a vacuum to the atmospheric pressure, so that the atmospheric pressure is applied from the outer side of the sealing member not being completely cured, and the position of the sealing member deviates inward. Even if the void portion is kept in a vacuum, the substrates are pushed by the atmospheric pressure and warp, and accordingly, unevenness of the gap (gap unevenness) between the substrates easily occurs.

BRIEF DESCRIPTION OF THE DRAWINGS

FIG. 1(a) is a sectional view taken along I-I of FIG. 1(b), and FIG. 1(b) is an enlarged plan view of a part of the liquid crystal display element.

DETAILED DESCRIPTION

Figure 1:
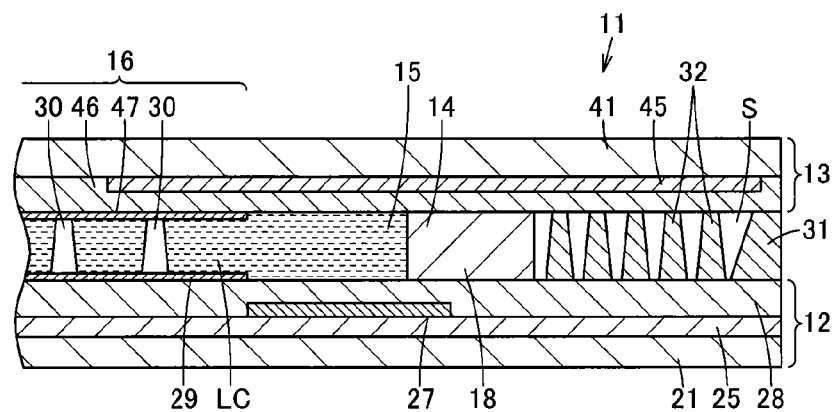
FIG. 1 show a liquid crystal display element according to a first embodiment.
Figure 1:
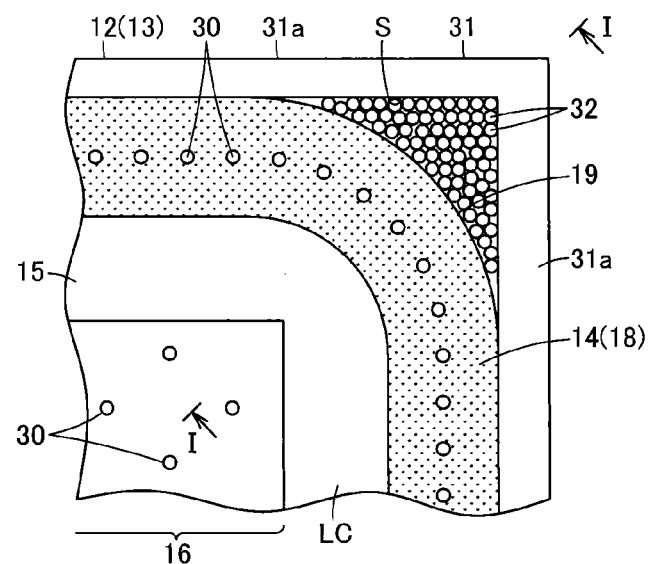
Figure 2:
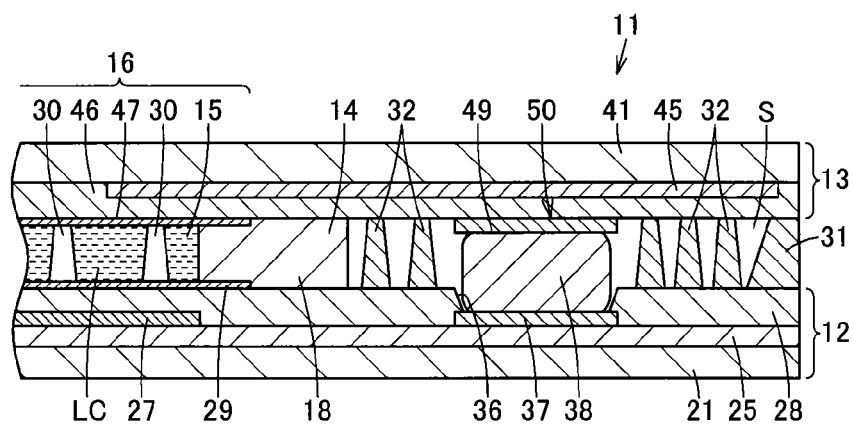
FIG. 2(a) is a sectional view taken along II-II of FIG. 2(b)
FIG. 2(b) is an enlarged plan view of a part of the liquid crystal display element.
Figure 2:
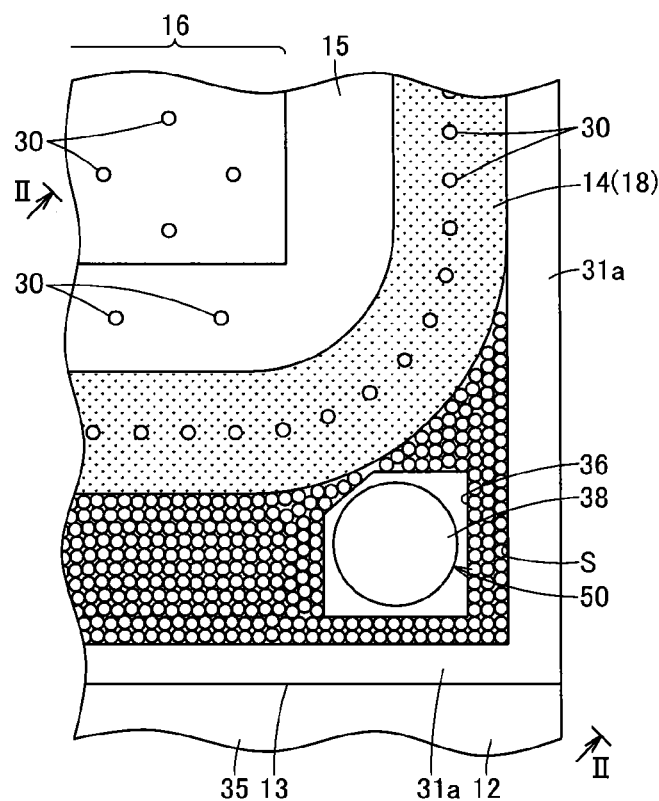
Figure 3:
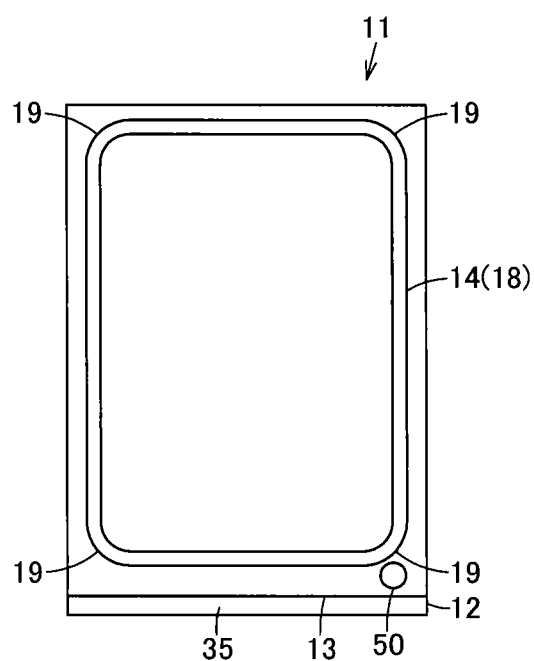
FIG. 3 is a plan view showing the same liquid crystal display element, FIG. 4 are explanatory views showing a method for manufacturing the same liquid crystal display element in order from (a) to (g)

A liquid crystal display element according to an embodiment includes substrates opposed to each other and paired. In addition, the liquid crystal display element includes a liquid crystal layer interposed between the substrates. Further, the liquid crystal display element includes a sealed portion that has bending corner portions at positions spaced from the outer edges of the substrates, and surrounds the periphery of the liquid crystal layer and bonds the substrates together. The liquid crystal display element includes main gap holding members that are interposed between the substrates at the position of the liquid crystal layer and hold the gap between the substrates. The liquid crystal display element includes auxiliary gap holding members that are interposed between the substrates to fill the portions between the outer side portions of the corner portions of the sealed portion and the outer edge sides of the substrates, and hold the gap between the substrates.

Hereinafter, a constitution of a first embodiment is described with reference to the drawings.

In FIG. 1 to FIG. 3, 11 denotes a liquid crystal panel as a liquid crystal display element, and the liquid crystal display panel 11 is a transmissive active matrix type liquid crystal panel that displays an image by transmitting planar light from an unillustrated backlight disposed on, for example, the back side.

Specifically, in the liquid crystal panel 11, an array substrate 12 being an active matrix substrate as a quadrilateral (first) substrate and a counter substrate 13 as a quadrilateral (second) substrate are opposed to each other via a predetermined gap (cell gap) so that the counter substrate 13 is on the display side, and are bonded together by, for example, a quadrilateral frame-shaped sealed portion 14, the inner side of the sealed portion 14 is filled with a liquid crystal layer 15 made of a liquid crystal material LC, and unillustrated polarizing plates are attached to the display side (opposite side of the liquid crystal layer 15) of the array substrate 12 and the back side (opposite side of the liquid crystal layer 15) of the counter substrate 13, respectively, and an active area, that is, a display region 16 in which a plurality of pixels are disposed in, for example, a matrix to display an image is formed to have, for example, a quadrilateral shape at the position of the liquid crystal layer 15.

Here, the sealed portion 14 is formed to have a width of, for example, approximately 0.25 mm by curing a fluid-like sealing member 18 being an ultraviolet curable resin and a thermosetting resin that are cured by ultraviolet rays (UV) and heat. The sealed portion 14 is formed into, in the present embodiment, a quadrilateral frame shape, and is spaced inward from the outer edges of the substrates 12 and 13, and have bending corner portions 19 at the four corners. At these corner portions 19, the sealing member 18 constituting the sealed portion 14 is continuously applied in quadrilateral frame shapes by using a dispenser as an unillustrated application device, so that the corner portions 19 are curved into arc shapes microscopically.

The array substrate 12 includes a quadrilateral plate-shaped array substrate main body 21 as a (first) substrate main body formed of glass or synthetic resin with translucency and insulating performance, and at a position corresponding to the display region 16 on one principal surface on the liquid crystal layer 15 side of the array substrate main body 21, pluralities of scanning lines and signal lines intersecting in a grid pattern while being insulated from each other, thin-film transistors (TFT) being switching liquid crystal display elements using, for example, polysilicon (p-Si) as a semiconductor layer to be electrically connected to the scanning lines and signal lines at the intersect positions of the scanning lines and signal lines, pixel electrodes (display electrodes) which constitute pixels and into which image signals are written by the thin-film transistors, and an interlayer film 25 that insulates the layers and extend to the outer side of the display region 16 (sealed portion 14), etc., are formed. On the inner side of the sealed portion 14 on one principal surface of the array substrate main body 21 and on the outer side of the display region 16, a circuit portion 27 for driving the thin-film transistors, etc., is formed on the interlayer film 25. In the array substrate main body 21, a planarizing layer 28 for planarization is formed by covering the portions such as the interlayer film 25 and the circuit portion 27. On the planarizing layer 28, in the display region 16, an orientation film 29 for orienting the liquid crystal material LC and main spacers 30 as main gap holding members are formed, and on the planarizing layer 28, on the outer side of the sealed portion 14, an outer edge spacer 31 as an outer edge gap holding member and auxiliary spacers 32 as a number of auxiliary gap holding members filled between the sealed portion 14 and the outer edge spacer 31 are formed. The array substrate 12 is bonded to the counter substrate 13 in a state where one end portion of the array substrate is longer than that of the counter substrate 13, and the other end portion and both side portions are matched with those of the counter substrate 13, and one end portion projecting more than the counter substrate 13 serves as an external terminal portion (OLB portion) 35 to be electrically connected to an external circuit. Further, near the external terminal portion 35, at the position of the corner portion 19 of the sealed portion 14 (display region 16), an opening 36 is formed in the planarizing layer 28, and through the opening 36, a wiring portion 37 with conductivity deposited on the interlayer film 25 is exposed, and on the exposed wiring portion 37, a conductive paste 38 such as gold paste as a conducting portion to be electrically connected to the counter substrate 13 side is disposed and electrically connected to the wiring portion 37. The wiring portion 37 is electrically connected to the circuit portion 27, etc.

The spacers 30, 31, and 32 are deposited in the same process by using the same material, for example, a negative photosensitive organic material.

The main spacers 30 are disposed to be spaced from each other in, for example, the display region 16 and the central portion of the sealed portion 14 to have a predetermined disposition density.

The outer edge spacer 31 is cut together with the array substrate main body 21, etc., at the time of manufacturing of the liquid crystal panel 11, and is disposed along the outer side portion of the sealed portion 14 at the position of the outer edge of the counter substrate 13, and is formed to be, for example, wider than the main spacers 30. Specifically, the outer edge spacer 31 is formed into a quadrilateral frame shape having four side portions 31a formed straight so as to be substantially orthogonal to each other. Therefore, triangular voids S are formed between the corner portions 19 of the sealed portion 14 and the corners between the side portions 31a and 31a opposed to the corner portions 19 (FIG. 1(b) and FIG. 2(b)).

The auxiliary spacers 32 are disposed to fill the voids S formed between the outer side portions of the corner portions 19 and the substrates 12 and 13, that is, in the present embodiment, between the corner portions 19 and the outer edge spacers 31. These auxiliary spacers 32 are formed into, for example, columnar shapes with a size (thickness) and a height substantially equal to those of the main spacers 30, and are disposed close to each other at minimum intervals so that there is substantially no gap between them. Specifically, these auxiliary spacers 32 are formed to fill the voids S. Therefore, the disposition density of the auxiliary spacers 32 is set to be higher than the disposition density of the main spacers 30.

On the other hand, the counter substrate 13 includes a quadrilateral plate-shaped counter substrate main body 41 as a (second) substrate main body formed of glass or synthetic resin, etc., with translucency and insulating performance, and at a position corresponding to the display region 16 on one principal surface on the liquid crystal layer 15 side of the counter substrate main body 41, a color filter layer including coloring portions of red (R), green (G), and blue (B) for coloring the pixels is formed, and on the color filter layer, a transparent counter electrode being a common electrode for setting a ground potential common to the thin-film transistors of the array substrate 12 is formed. On the outer side of the sealed portion 14 on one principal surface of the counter substrate main body 41, a light shielding film 45 that shields leak light from the outside of the display region 16 is formed. Further, an overcoat layer 46 for planarization is formed to cover the portions such as the counter electrode and the light shielding film 45. On the overcoat layer 46, in the display region 16, an orientation film 47 for orientation of the liquid crystal material LC is formed.

Therefore, the main spacers 30 are formed between the orientation films 29 and 47, and the spacers 31 and 32 are formed between the planarizing layer 28 and the overcoat layer 46.

The counter electrode is electrically connected to the wiring portion 37 on the array substrate 12 side via the conductive paste 38 through a wiring portion 49 deposited on the overcoat layer 46. As a result, the wiring portions 37 and 49 and the conductive paste 38 constitute a transfer portion 50 that electrically connects the array substrate 12 side and the counter substrate 13 side. Specifically, the transfer portion 50 is formed in, for example, the void S near the external terminal portion 35, and in the void S, the position excluding the transfer portion 50 is filled by the auxiliary spacers 32.

The liquid crystal layer 15 is interposed between the array substrate 12 and the counter substrate 13, the periphery of the liquid crystal layer is surrounded by the sealed portion 14, and orientation of the liquid crystal material LC forming the liquid crystal layer 15 is controlled by the orientation films 29 and 47. The liquid crystal material LC rotates the polarization plane of light that is irradiated from the backlight and passed through the polarizing plate on the array substrate 12 side according to a potential difference between the pixel electrodes and the counter electrode.

Figure 4:
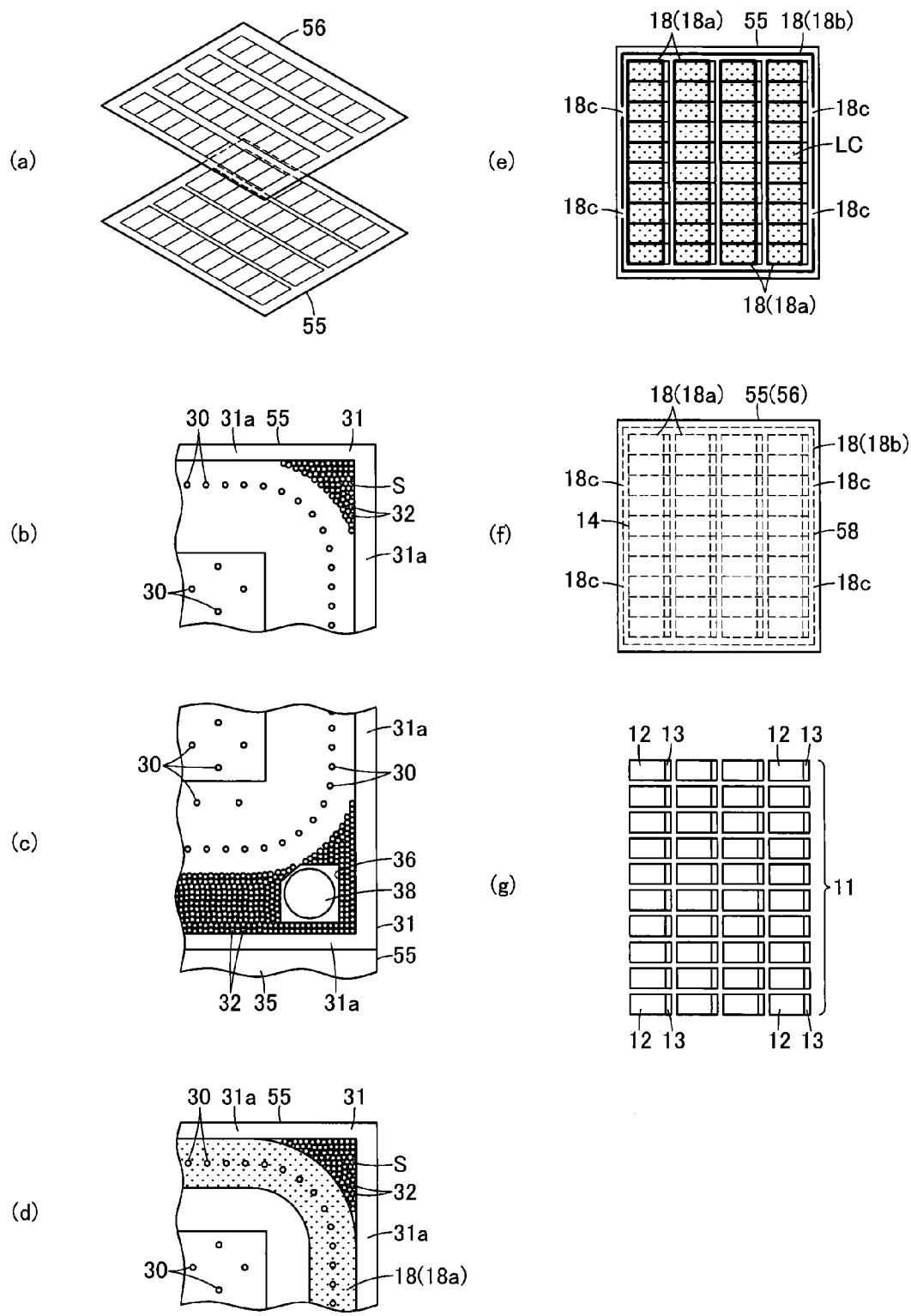

Next, a method for manufacturing the liquid crystal panel 11 according to the first embodiment described above is described with reference to FIG. 4 as well.

When manufacturing the liquid crystal panel 11, a large-sized substrate 55 for array substrates that is a (first) large-sized substrate having a size larger than that of the array substrate 12 and is a (first) mother substrate forming the array substrate main body 21 of the array substrate 12, and a large-sized substrate 56 for counter substrates that is a (second) large-sized substrate having a size larger than that of the counter substrate 13 and substantially equal to the size of the large-sized substrate 55 for array substrates, and is a (second) mother substrate forming the counter substrate main body 41 of the counter substrate 13, are used (FIG. 4(a)) to simultaneously manufacture a plurality of liquid crystal panels 11, and the liquid crystal panels 11 are individually cut out.

First, by repeatedly applying a predetermined deposition process and patterning process to the large-sized substrate 55 for array substrates, the array portions of the scanning lines, signal lines, thin-film transistors, pixel electrodes, the interlayer film 25, the circuit portion 27, the planarizing layer 28, the orientation film 29 and the wiring portion 37 (FIG. 1(a) and FIG. 2(a)), etc., for each array substrate 12 are formed in advance in a matrix. To the orientation film 29, rubbing is appropriately applied in a predetermined direction as necessary.

Similarly, by repeatedly applying a predetermined deposition process and patterning process to the large-sized substrate 56 for counter substrates, the color filter layer, the light shielding film 45, the counter electrode, the overcoat layer 46, the orientation film 47 and the wiring portion 49 (FIG. 1(a) and FIG. 2(a)), etc., for each counter substrate 13 are formed in advance in a matrix. To the orientation film 47, rubbing is appropriately applied in a predetermined direction as necessary.

Then, on at least either one of the large-sized substrate 55 for array substrates and the large-sized substrate 56 for counter substrates, in the present embodiment, on the large-sized substrate 55 for array substrates, the spacers 30, 31, and 32 are formed (FIG. 4(b)). At this time, these spacers 30, 31, and 32 are formed in a manner in which a photosensitive organic material is applied by using, for example, a slit or a spin coater and is then subjected to pattern exposure by using a predetermined photo-mask, and thereafter, the photosensitive organic material is developed, baked, and cured.

Further, on either one of the large-sized substrate 55 for array substrates and the large-sized substrate 56 for counter substrates, in the present embodiment, on the large-sized substrate 55 for array substrates, the conductive paste 38 is applied to the wiring portion 37 exposed from the opening 36 (FIG. 4(c)), and the wiring portion 37 and the conductive paste 38 are electrically connected.

Next, to either one of the large-sized substrate 55 for array substrates and the large-sized substrate 56 for counter substrates, in the present embodiment, to the large-sized substrate 55 for array substrates on which spacers 30, 31 and 32 are formed, a fluid-like sealing member 18 is applied by using an unillustrated dispenser, etc. At this time, the dispenser forms the frame-shaped portions 18a (FIG. 4(d)) to which the sealing member 18 is continuously applied in quadrilateral frame shapes along the side portions 31a of the outer edge spacers 31 and the inner edges of the auxiliary spacers 32, and an outer frame portion 18b (FIG. 4(e)) to which the sealing member 18 is applied along the outer edge of the large-sized substrate 55 for array substrates. Preferably, in the outer frame portion 18b, a plurality of openings 18c for introducing the outside air are appropriately provided. Inside the outer frame portion 18b, the sealing member 18 may be applied along the portions between the columns of the array portions.

In addition, a predetermined amount of the liquid crystal material LC is dropped in the regions inside the frame-shaped portions 18a to which the sealing member 18 is applied in quadrilateral frame shapes.

In this state, the large-sized substrate 55 for array substrates to which the liquid crystal material LC is dropped and the large-sized substrate 56 for counter substrates are bonded together via the sealing member 18 while their positions are aligned with each other in a vacuum (FIG. 4(f)). The conductive paste 38 is closely attached to the wiring portion 49 of the large-sized substrate 56 for counter substrates side so as to be electrically connected to the wiring portion.

Then, by releasing these large-sized substrates 55 and 56 bonded together in the atmosphere, air is introduced from the openings 18c into the inside of the outer frame portion 18b to gradually restore the inside to the atmospheric pressure state, and due to the pressure difference between the regions inside the frame-shaped portions 18a of the sealing member 18 of the large-sized substrates 55 and 56 and the outside air, the sealing member 18 is crushed, and a predetermined gap is formed between the large-sized substrates 55 and 56. At this time, the positions corresponding to the corner portions 19 of the frame-shaped portions 18a of the sealing member 18 are covered by the auxiliary spacers 32, so that the atmospheric pressure does not directly act on the positions corresponding to the corner portions 19 of the sealing member 18.

Thereafter, by irradiating ultraviolet rays and applying heat treatment to the sealing member 18, the sealing member 18 is cured to make the frame-shaped portions 18a and the outer frame portion 18b turn into the sealed portions 14 and an outer peripheral sealed portion 58.

Next, along the positions of the side portions 31a of the outer edge spacers 31 (FIG. 4(b) and FIG. 4(c)), the large-sized substrates 55 and 56 are appropriately cut together with the outer edge spacers 31 (FIG. 4(g)). As a result, array substrates 12 are cut out from the large-sized substrate 55 for array substrates and counter substrates 13 are cut out from the large-sized substrate 56. Thereafter, by mounting the polarizing plates, etc., to each of these cut-out array substrates 12 and counter substrates 13, the liquid crystal panels 11 are completed.

As described above, according to the first embodiment described above, the spacers 30 and 32 are disposed on the large-sized substrate 55 for array substrates from which the array substrates 12 are formed, and the fluid-like sealing member 18 for forming the sealed portion 14 is applied to the large-sized substrate 55 for array substrates at positions at which the outer side portions positioned corresponding to the corner portions 19 can come into contact with the auxiliary spacers 32, the liquid crystal material LC for forming the liquid crystal layer 15 is dropped to the inner side of the sealing member 18, the large-sized substrate 55 for array substrates on which the liquid crystal material LC is dropped and the large-sized substrate 56 for counter substrates for forming the counter substrates 13 are bonded together in a vacuum via the sealing member 18, and by releasing these large-sized substrates 55 and 56 bonded together in the atmosphere and crushing the sealing member 18 by a pressure difference, the positions corresponding to the corner portions 19 are protected against the atmospheric pressure load at the time of releasing in the atmosphere by the auxiliary spacers 32, and accordingly, the atmospheric pressure load can be prevented from directly acting on the corner portions 19. Therefore, air insertion that is entering of air from the outer side portions of the corner portions 19, that is, the void S sides to the liquid crystal material LC side on the inner side of the sealing member 18 can be suppressed, and discontinuity of the sealing member 18 (breakage of sealing) at the corner portions 19 can be suppressed, and at the corner portions 19, the sealing member 18 can be suppressed from being pushed and moved to the liquid crystal material LC side being the display region 16 side by the atmospheric pressure load.

Further, along at least a part of the outer edge of the counter substrate 13, the outer edge spacer 31 is formed between the substrates 12 and 13, and the portion between the outer edge spacer 31 and the corner portion 19 is filled with the auxiliary spacers 32, so that after the sealing member 18 is cured to form the sealed portions 14, the large-sized substrates 55 and 56 are cut together with the outer-edge spacers 31 along the positions of the outer edge spacers 31 to form the liquid crystal panels 11, and accordingly, the accuracy of the cutting lines of the large-sized substrates 55 and 56 can be improved. Therefore, in the large-sized substrates 55 and 56, the liquid crystal panels 11 can be formed close to each other, and the liquid crystal panels 11 adapted to a narrower frame structure having a shorter distance from the display region 16 to the outer edge portion can be formed.

By forming the spacers 30, 31, and 32 on the large-sized substrate 55 for array substrates by using the same material in the same process, as compared with the case where these spacers are formed separately from different materials, the number of manufacturing processes can be reduced.

Further, the sealing member 18 is applied to the large-sized substrate 55 for array substrates on which the spacers 30, 31, and 32 are disposed, so that the accuracy of the application positions of the sealing member 18 with respect to the spacers 30, 31, and 32, specifically, with respect to the outer edge spacers 31 and the auxiliary spacers 32 can be further improved.

By forming the spacers 30 and 32 into sizes substantially equal to each other, the forming accuracy of these spacers 30 and 32 due to the height difference of the spacers 30 and 32 can be easily uniformized without requiring fine control of the exposure time, so that these spacers 30 and 32 hardly become uneven in height, and unevenness of the gap between the substrates 12 and 13 can be more reliably prevented from being caused.

Figure 5:
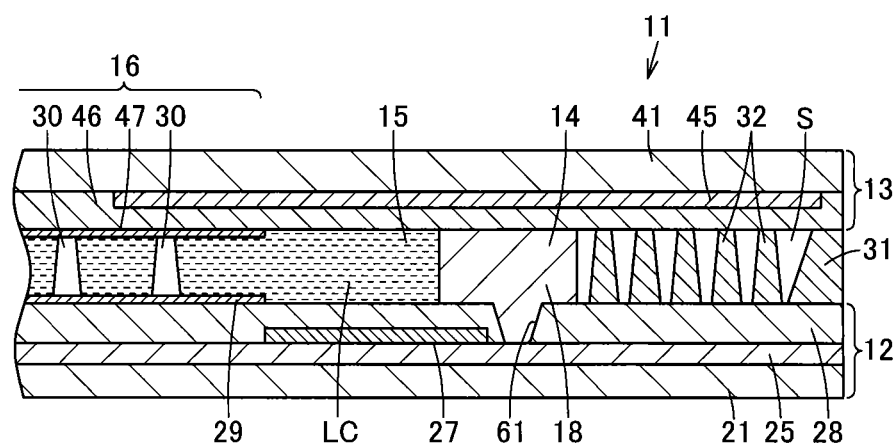
FIG. 5 is a sectional view showing a part of a liquid crystal display element according to a second embodiment.

In the first embodiment described above, it is also possible that a groove portion 61 is formed in the planarizing layer 28 of the array substrate 12 and the sealed portion 14 is formed in the groove portion 61 in the same manner as in the second embodiment shown in FIG. 5. In this case, by increasing the bonding area between the sealed portion 14 and the array substrate 12, the substrates 12 and 13 can be more firmly bonded together by the sealed portion 14, so that the sealed portion 14 can be more reliably prevented from deviating to the display region 16 side due to the air pressure difference between the inner side and the outer side of the sealing member (sealed portion 14).

In each of the embodiments described above, in a case of a liquid crystal mode that prevents electrolysis from occurring in the thickness direction of the liquid crystal panel 11, such as an IPS mode, the counter electrode (common electrode) is provided on the array substrate 12 side. In this case, the transfer portion 50 is unnecessary.

Further, the color filter layer and the light shielding film may be provided on the array substrate 12 side.

Similarly, the spacers 30, 31, and 32 can also be provided on the counter substrate 13 (large-sized substrate 56 for counter substrates) side. In this case, by also providing the sealing member 18 on the counter substrate 13 (large-sized substrate 56 for counter substrates) side, the same effects as of the embodiments described above can be obtained.

Further, the spacers 30, 31, and 32 are provided on at least either one of the large-sized substrates 55 and 56.

According to at least one of the embodiments described above, at the position of the liquid crystal layer 15, the main spacers 30 are formed between the substrates 12 and 13, and the auxiliary spacers 32 are disposed between the substrates 12 and 13 to fill the portions between the outer side portions of the corner portions 19 of the sealed portion 14 and the outer edge side of the substrates 12 and 13, and accordingly, it can be prevented that air enters the sealing member 18 constituting the sealed portion 14 from the outside at the position corresponding to the corner portion 19 and generate air bubbles and the sealing member 18 is pushed to the liquid crystal layer 15 side at the corner portion 19 during manufacturing of the liquid crystal panel 11, so that the atmospheric pressure load applied to the sealing member 18 constituting the sealed portion 14 at the position corresponding to the corner portion 19 can be reduced and sealing performance can be secured.

In addition, the outer edge spacer 31 is formed along at least a part of the outer edge of the counter substrate 13, and the portion between the outer edge spacer 31 and the corner portion 19 is filled by the auxiliary spacers 32, and accordingly, the auxiliary spacers 32 and the outer edge spacer 31 are positioned substantially without gaps on the outer side of the sealed portion 14, so that, for example, even when a load is applied to a position on the outer side of the sealed portion 14 from the surface of the substrate 12 or 13, the substrates 12 and 13 (substrate main bodies 21 and 41) do not warp, the gap between these substrates 12 and 13 is kept and unevenness of the gap between the substrates 12 and 13 can be reduced. As a result, the display quality of the liquid crystal panel 11 can be secured.

In particular, in the liquid crystal panel 11 whose frame is increasingly narrowed, the width of the sealed portion 14 (sealing member 18) also becomes narrower, and the bonding area (adhesion) tends to relatively decrease. Therefore, by protecting the sealed portion 14 (sealing member 18) against the atmospheric pressure load by the auxiliary spacers 32, the sealed portion 14 (sealing member 18) is hardly pushed by the atmospheric pressure load even if the sealed portion 14 (sealing member 18) is narrowed, and this preferably adapts to a narrower frame structure.

By making the disposition density of the auxiliary spacers 32 higher than the disposition density of the main spacers 30, the corner portions 19 can be more reliably protected by the auxiliary spacers 32, and air can be more reliably prevented from entering the positions corresponding to the corner portions 19 of the sealed portion 14 (sealing member 18) from the portions between the auxiliary spacers 32 and 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display element comprising:
   quadrilateral substrates opposed to each other and paired;
   a liquid crystal layer interposed between these substrates;
   a sealed portion that includes bending corner portions at positions spaced from the outer edges of the substrates and straight portions formed straight along the outer edges of the substrates from the corner portions, and that continuously surrounds the periphery of the liquid crystal layer and bonds the substrates together;
   main gap holding members that are interposed between the substrates at the position of the liquid crystal layer, and hold the gap between the substrates;
   an outer edge gap holding member that is formed into a quadrilateral frame shape including four side portions formed straight to be orthogonal to each other at the outer edge of either one of the substrates, holds the gap between the substrates, does not come into contact with the corner portions, and includes voids formed between the outer edge gap holding member and the sealed portion at positions of corner portions of the substrates at the outer edge in contact with the straight portion sandwiching the corner portions of the sealed portion; and
   auxiliary gap holding members that are interposed between the substrates to fill the voids, and hold the gap between the substrates.

2. The liquid crystal display element according to claim 1, wherein
   the disposition density of the auxiliary gap holding members is higher than that of the main gap holding members.

3. The liquid crystal display element according to claim 1, wherein
   the main gap holding members and the auxiliary gap holding members are equal in height to each other.

4. A method for manufacturing a liquid crystal display element that includes quadrilateral substrates opposed to each other and paired, a liquid crystal layer interposed between these substrates, a sealed portion that includes bending corner portions at positions spaced from the outer edges of the substrates and straight portions formed straight along the outer edges of the substrates from the corner portions and surrounds the periphery of the liquid crystal layer and bonds the substrates together, main gap holding members that are interposed between the substrates at the position of the liquid crystal layer and hold the gap between the substrates, an outer edge gap holding member that is formed into a quadrilateral frame shape including four side portions formed straight to be orthogonal to each other at the outer edge of either one of the substrates, holds the gap between the substrates, does not come into contact with the corner portions, and includes voids formed between the outer edge gap holding member and the sealed portion at positions of corner portions of the substrates at the outer edge in contact with the straight portion sandwiching the corner portions of the sealed portion, and auxiliary gap holding members that are interposed between the substrates to fill the voids and hold the gap between the substrates, comprising:
   disposing the main gap holding members, the auxiliary gap holding members and the outer edge gap holding member on at least either one of large-sized substrates for forming the substrates;
   continuously applying a fluid-like sealing member for forming the sealed portion to either one of the large-sized substrates at a position at which at least the outer side portions of the corner portions of the sealed portion can come into contact with the auxiliary gap holding members and at which the outer side portions of the straight portions sandwiching the corner portions of the sealed portion can come into contact with the outer edge gap holding member;
   dropping a liquid crystal material for forming the liquid crystal layer to the inner side of the sealing member;
   bonding the large-sized substrate to which the liquid crystal material is dropped and the other large-sized substrate together in a vacuum via the sealing member;
   releasing the large-sized substrates bonded together in the atmosphere; and
   forming the sealed portion by curing the sealing member.

5. The method for manufacturing a liquid crystal display element according to claim 4, wherein
   the disposition density of the auxiliary gap holding members is made higher than that of the main gap holding members.

6. The method for manufacturing a liquid crystal display element according to claim 4, wherein
   the main gap holding members and the auxiliary gap holding members are made equal in height to each other.

7. The liquid crystal display element according to claim 1, wherein
   the voids are triangular.

8. The liquid crystal display element according to claim 1, further comprising:
   a planarizing layer for planarization including a groove portion and serving as a foundation for the main gap holding members, the outer edge gap holding member, and the auxiliary gap holding members,
   wherein the sealed portion is formed in the groove portion.

9. The liquid crystal display element according to claim 1, wherein
   the main gap holding members, the outer edge gap holding member, and the auxiliary gap holding members are formed of a negative photosensitive organic material.

10. The method for manufacturing a liquid crystal display element according to claim 4, wherein
the voids are triangular.

11. The method for manufacturing a liquid crystal display element according to claim 4, further comprising:
forming a groove portion in a planarizing layer for planarization serving as a foundation for the main gap holding members, the outer edge gap holding member, and the auxiliary gap holding members, and
forming the sealed portion in the groove portion by applying a fluid-like sealing member for forming the sealed portion to the groove portion.

12. The method for manufacturing a liquid crystal display element according to claim 4, further comprising:
forming the main gap holding members, the outer edge gap holding member, and the auxiliary gap holding members of a negative photosensitive organic material.

* * * * *